W. A. MARTIN.
STALK CUTTER.
APPLICATION FILED JUNE 3, 1913.

1,079,505.

Patented Nov. 25, 1913.
2 SHEETS—SHEET 1.

Gilpin + 370616 Stalk-choppers, Revolving, Vertical.
Cooper 849659 " " "
Scott 1039327 " " "
McCaul 464779 Cotton-choppers, Revolving, Horizontal.

WITNESSES:
J. S. Murray
David Drennan

INVENTOR
WILLIAM A. MARTIN
BY John M. Spellman
ATTORNEY

W. A. MARTIN.
STALK CUTTER.
APPLICATION FILED JUNE 3, 1913.
1,079,505.
Patented Nov. 25, 1913.
2 SHEETS—SHEET 2.
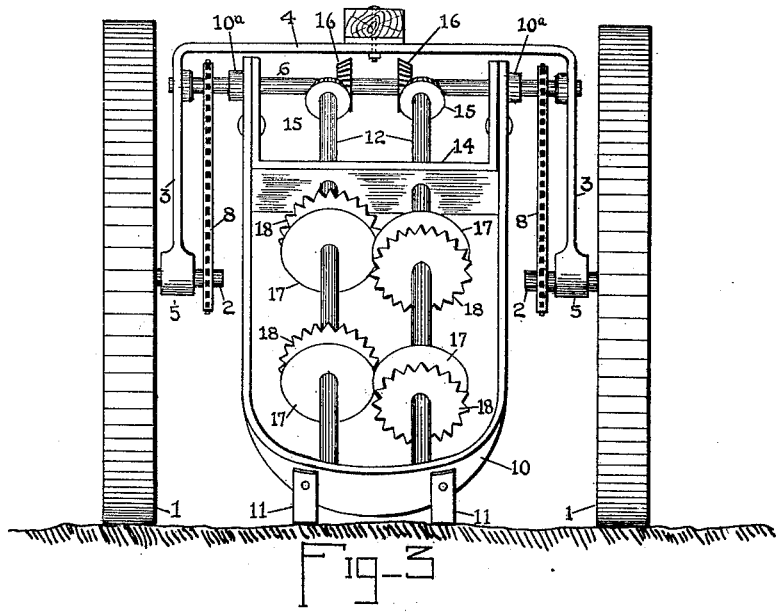
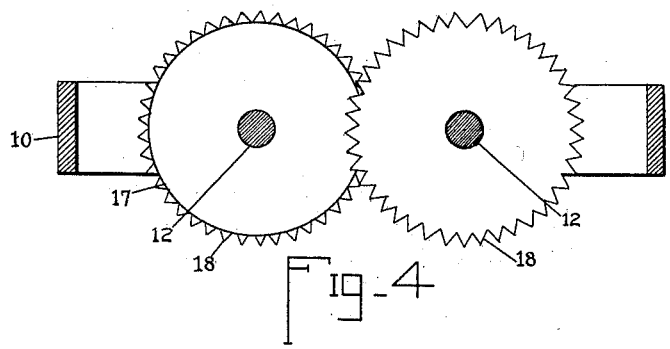
WITNESSES:
INVENTOR
WILLIAM A. MARTIN
BY
ATTORNEY

UNITED STATES PATENT OFFICE.

WILLIAM A. MARTIN, OF WAXAHACHIE, TEXAS, ASSIGNOR OF ONE-THIRD TO JOHN F. PHILLIPS, ONE-THIRD TO GEORGE L. GRIFFIN, AND ONE-SIXTH TO THOMAS B. CRIDDLE, ALL OF WAXAHACHIE, TEXAS.

STALK-CUTTER.

1,079,505. Specification of Letters Patent. Patented Nov. 25, 1913.

Application filed June 3, 1913. Serial No. 771,550.

*To all whom it may concern:*

Be it known that I, WILLIAM A. MARTIN, citizen of the United States, residing at Waxahachie, in the county of Ellis and State of Texas, have invented certain new and useful Improvements in Stalk-Cutters, of which the following is a specification.

My invention relates to new and useful improvements in stalk cutters. Its object is to provide a wheeled farm implement that will travel along a row of stalks, cutting them into small fragments, such as will rapidly disintegrate and enrich the soil.

The object is more specifically to provide a stalk cutter in which are embodied a pair of parallel shafts, mounted transversely of the axle, and inclined downwardly from the front to the rear of the machine, said shafts carrying a plurality of disk knives mounted in adjacent pairs which, through their reversed rotation, form shears, adapted to cut any stalks which are drawn between them by their rotation.

A further object is to provide toothed disks, one of which acts in conjunction with each disk knife to guide the stalks of a row between the pair of disk knives correlated with said guiding member.

Finally the object of the invention is to provide a device of the character described that will be strong, durable, simple and efficient and comparatively easy to construct, and also one, the various parts of which will not be likely to get out of working order.

Figure 1:
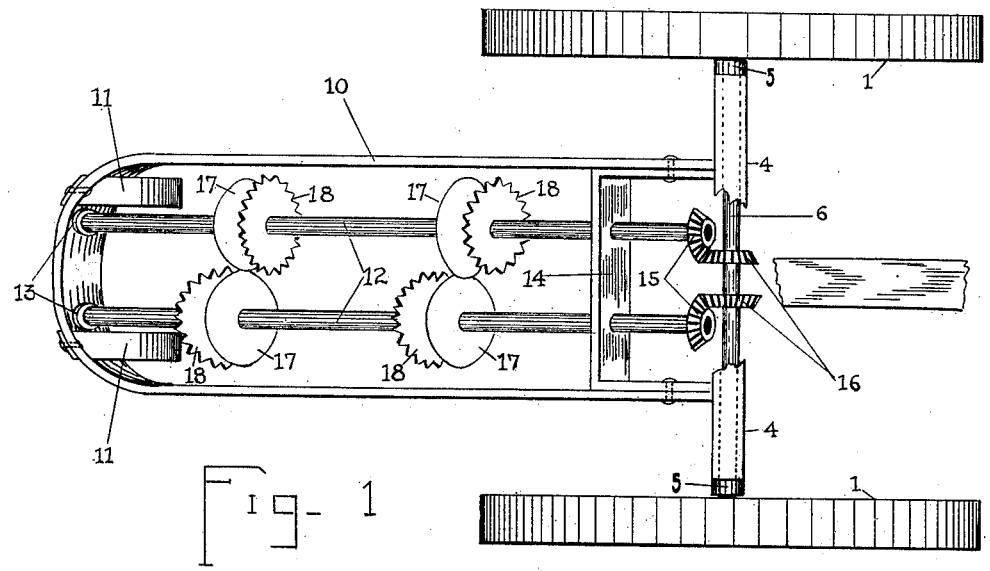
Figure 2:
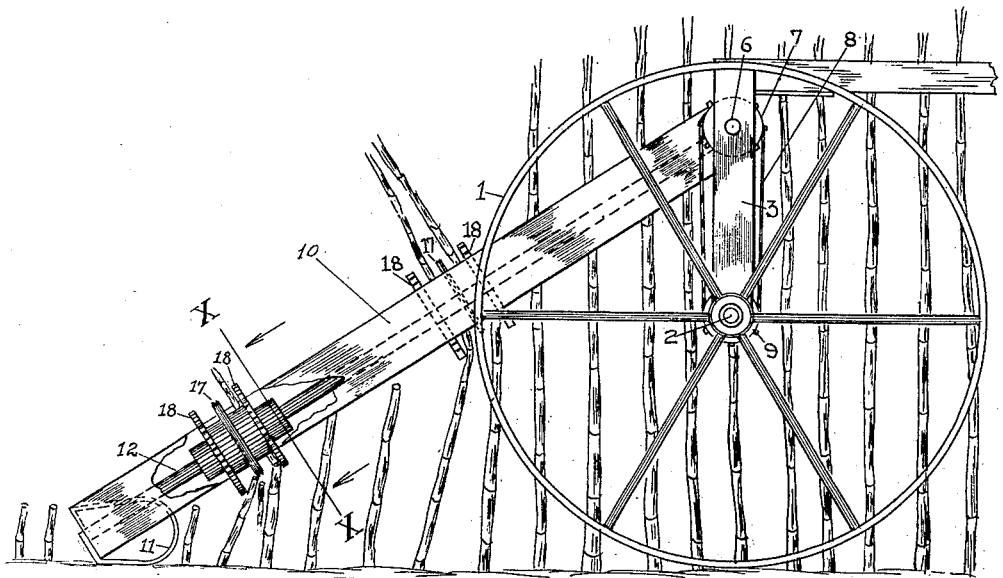

With these and various other objects in view, my invention has relation to certain novel features of the construction and operation, an example of which is described in the following specification, and illustrated in the accompanying drawings, wherein:

Figure 1 is a plan view of a stalk cutter embodying the novel features of the present invention, the portion of the arch supporting the wheels being broken away to reveal a transmission mechanism beneath the same. Fig. 2 is a view of the stalk cutter in side elevation, a portion of its framework being again broken away for the sake of clearness, the stalks of a row, which are being cut by the machine, being also shown. Fig. 3 is a rear view of the machine. Fig. 4 is a sectional, detail view, showing one of the stalk-cutting devices, the section being taken upon the line *x—x* of Fig. 2.

Referring now more particularly to the drawings, wherein like reference characters designate similar parts in all the figures, the numeral 1 denotes a pair of transporting wheels, each of which is fast upon the outer end of a short axle member 2. The axle members 2 are held in proper alinement by means of an arched bar, comprising a pair of vertical members 3, connected at their upper extremities by an integral, horizontal member 4, and carrying at their lower extremities a pair of bearings 5 in which the short axles 2 are respectively mounted. A short distance below the horizontal, arch member, a horizontal shaft 6 is rotatably mounted, its extremities being journaled in the upper portions of the vertical arch members 3. Upon the end portions of the shaft 6 a pair of sprocket wheels 7 are rigidly mounted, and two sprocket chains 8, having their upper portions carried by the sprocket wheels, have their lower portions mounted upon a pair of sprocket wheels 9, one of which is fast upon the inner extremity of each axle member 2. From the middle portion of the shaft 6, there is swung an elongated, U-shaped frame 10, such frame being extended rearwardly at a downward inclination, and having its rear or closed extremity adapted to drag upon the ground, as will presently be explained, and more fully. The shaft 6 is passed through the upper extremity of the spaced parallel members of the frame 10, said extremities being restricted from any displacement longitudinal with said shaft by a pair of set-collars 10ª, one of which is fast upon the shaft 6 at each side of said frame. A pair of spaced runners 11 are carried fast upon the closed lower end of the frame 10, serving to slightly elevate said frame extremity above the surface of the ground, and thereby preventing said extremity from being subjected to heavy wear, and decreasing the friction or draft, which would result if the lower end of the frame 10 were permitted to lie freely upon the surface of the ground. A pair of spaced, parallel shafts 12 are longitudinally mounted in the frame 10, their lower extremities being received by thrust bearings 13, carried fast upon the transverse, lower portion of the frame 10, and their upper extremities being held in a cross bar 14, extending between the upper portions of the parallel members of the frame 10. The end portions of the transverse bar 14 are bent at right angles, and extended parallel and contiguous with the parallel members of the frame, a sufficient distance to permit the shaft 6 to pass through their extremities. The contiguous portions of the bar 14 and the frame 10 are riveted together, as clearly shown in Fig. 1 of the drawings. The upper extremities of the two parallel shafts 12 terminate closely adjacent to the horizontal shaft 6, and a bevel gear 15 is mounted fast upon each of said extremities. The two gears 15 are respectively adapted to mesh with two bevel gears 16 mounted fast upon the middle portion of the shaft 6. It is thus apparent that during the travel of the machine, the two shafts 12 will each receive a constant rotation from one of the short axle members, the two rotations thus communicated, being equal in velocity, but opposite in direction. The shafts 12 together support a plurality of stalk-cutting devices, each device comprising two members, which are adjacently mounted upon the two shafts. These cutting devices are formed by disk-shaped knives 17, one of which is fast upon each shaft 12, their adjacent peripheral portions being made to slightly overlap each other. A short distance in front of one knife 17 of each pair is mounted a toothed feeding disk 18 having a slightly greater diameter than that of the adjacent knife. A slight distance behind the other knife 17 of the same pair is mounted a similar toothed feeding disk 18. Since the lower portions of the disks 18 are constantly toward each other, in their rotation, the teeth carried by these disks, have a tendency to feed the stalks, which contact with them, in between the pair of rotating shears formed by the rotary knives 17.

It is apparent from the above description that the stalks of the row, over which the above-described machine passes, will be cut into as many pieces as there are pairs of disk knives 17 mounted upon the two shafts 12. While there are only two of such cutting devices or units shown in the drawings, it is to be understood that the number of these devices employed or embodied in the machine may be varied at the option of the inventor.

The invention is presented as including all such modifications and changes as come within the scope of the following claims:

What I claim is:

1. A cutting unit for a stalk cutter comprising a pair of disk shaped knives adapted to rotate oppositely about parallel axes, their adjacent peripheral portions being overlapped, and a toothed disk mounted adjacent to each of said knives adapted to rotate about the same axis.

2. In a stalk cutter, the combination with a pair of parallel shafts, of a frame in which said shafts are mounted, means furnishing a pivotal support for one extremity of said frame, means adapted to communicate an opposite rotation to said shafts, a pair of disk shaped knives adjacently mounted upon said shafts, their adjacent peripheral portions being overlapped, and a pair of toothed disks mounted upon said shafts one adjacent to each of said knives.

In testimony whereof I have signed my name to this specification in the presence of two subscribing witnesses.

WILLIAM A. MARTIN.

Witnesses:
J. S. MURRAY,
EARLE C. WIGHT.

Copies of this patent may be obtained for five cents each, by addressing the "Commissioner of Patents, Washington, D. C."